(12) United States Patent
Hill et al.

(10) Patent No.: US 8,589,926 B2
(45) Date of Patent: Nov. 19, 2013

(54) ADJUSTING PROCESSOR UTILIZATION DATA IN POLLING ENVIRONMENTS

(75) Inventors: Jimmy Ray Hill, Austin, TX (US); Bret Ronald Olszewski, Austin, TX (US); Luc Rene Smolders, Rochester, MN (US); David Blair Whitworth, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 930 days.

(21) Appl. No.: 12/436,902

(22) Filed: May 7, 2009

(65) Prior Publication Data

US 2010/0287319 A1 Nov. 11, 2010

(51) Int. Cl.
*G06F 9/46* (2006.01)

(52) U.S. Cl.
USPC .......................................... 718/100; 718/104

(58) Field of Classification Search
USPC ....................................................... 718/104
See application file for complete search history.

(56) References Cited

U.S. PATENT DOCUMENTS

| | | | |
|---|---|---|---|
| 5,072,376 A * | 12/1991 | Ellsworth | 718/105 |
| 5,355,501 A | 10/1994 | Gross et al. | |
| 5,404,536 A | 4/1995 | Ramakrishnan et al. | |
| 6,079,025 A | 6/2000 | Fung | |
| 6,289,369 B1 | 9/2001 | Sundaresan | |
| 7,228,287 B1 * | 6/2007 | Samson et al. | 705/14.13 |
| 7,401,012 B1 | 7/2008 | Bonebakker et al. | |
| 7,421,592 B1 | 9/2008 | Kadatch et al. | |
| 2005/0138443 A1 | 6/2005 | Cooper | |
| 2005/0262365 A1 | 11/2005 | Lint et al. | |
| 2006/0200821 A1 * | 9/2006 | Cherkasova et al. | 718/1 |
| 2006/0265713 A1 * | 11/2006 | Depro et al. | 718/104 |
| 2007/0124736 A1 | 5/2007 | Gabor et al. | |
| 2007/0288728 A1 | 12/2007 | Tene et al. | |
| 2008/0028415 A1 | 1/2008 | Binns et al. | |
| 2009/0204954 A1 * | 8/2009 | Malmer et al. | 717/163 |

\* cited by examiner

*Primary Examiner* — Abdullah Al Kawsar
*Assistant Examiner* — Blake Kumabe
(74) *Attorney, Agent, or Firm* — Garg Law Firm, PLLC; Rakesh Garg; Libby Z. Toub

(57) ABSTRACT

A method, system, and computer usable program product for adjusting processor utilization data in polling environments are provided in the illustrative embodiments. An amount of a computing resource consumed during polling performed by the polling application over a predetermined period is received at a processor in a data processing system from a polling application executing in the data processing system. The amount forms a polling amount of the computing resource. Using the polling amount of the computing resource, another amount of the computing resource consumed for performing meaningful task is determined. The other amount forms a work amount of the computing resource. Using the work amount of the computing resource, an adjusted utilization of the computing resource is computed over a utilization interval. The data of the adjusted utilization is saved.

20 Claims, 6 Drawing Sheets

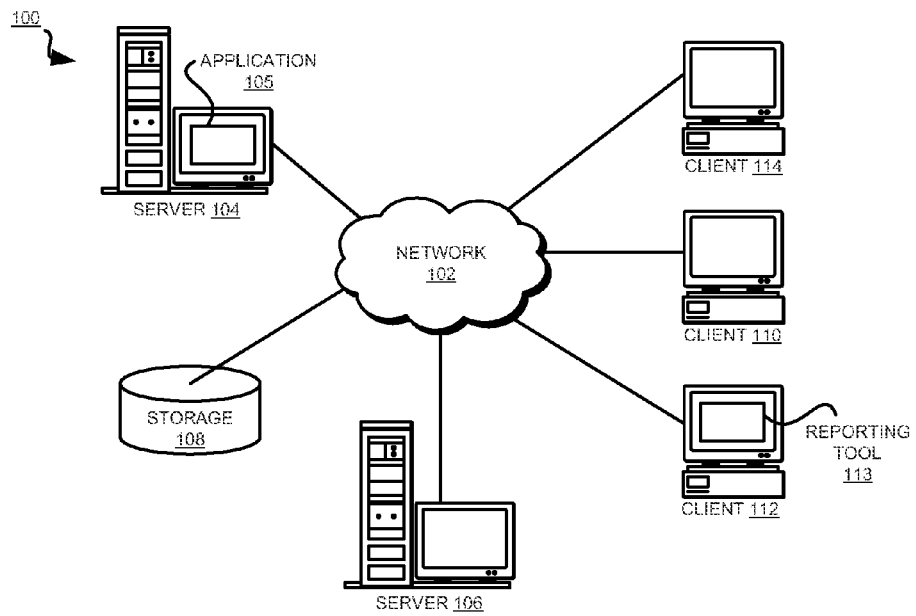
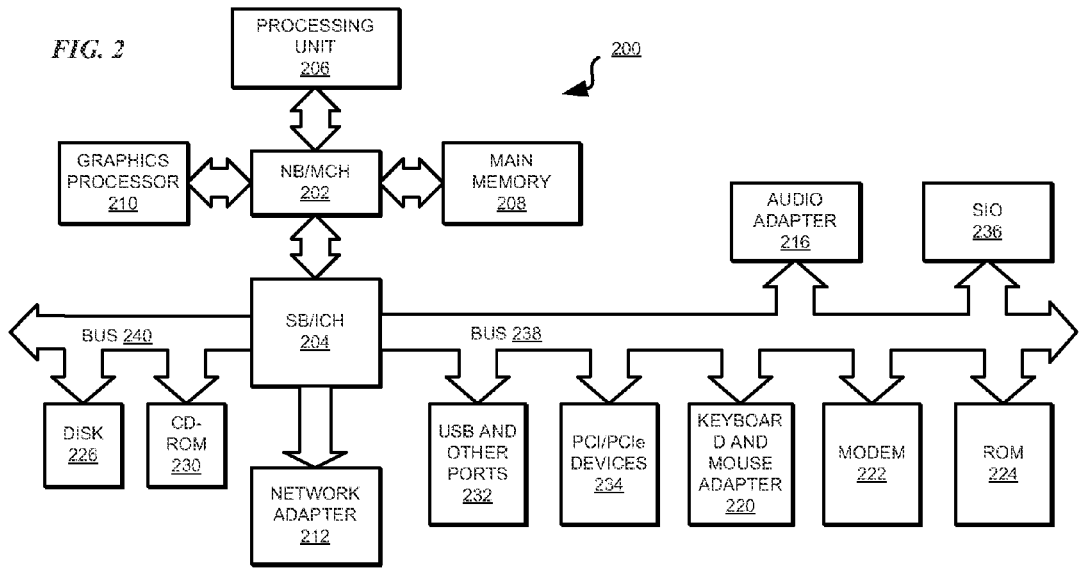
FIG. 2

ADJUSTING PROCESSOR UTILIZATION DATA IN POLLING ENVIRONMENTS

BACKGROUND OF THE INVENTION

1. Field of the Invention

The present invention relates generally to an improved data processing system, and in particular, to a method for determining utilization of computing resources in a data processing system. Still more particularly, the present invention relates to a computer implemented method, system, and computer usable program code for adjusting processor utilization data in environments that include polling applications.

2. Description of the Related Art

Software applications, hardware components, and firmware applications often have a provision to perform tasks upon the occurrence of certain events in a data processing system. An event may be a status or a change of status of a register, code, information, data, process, component, or application in the data processing system. For example, a network card being able to connect to a data network may be an event. Availability of data requested from a hard disk may be another example of an event. A function returning a computed value may also be an event. A switch being turned on or off may be an event. A register or a variable attaining a certain value may also be one of many possible examples of an event.

Software applications, hardware components, and firmware applications are collectively called applications for the purposes of this disclosure. In some instances, an application may learn about an event asynchronously, such as when the operating system informs the application that the event has occurred. In other cases, an application may poll a component of the operating system or a hardware component to determine whether the event of interest has occurred.

Polling is the process of requesting information, often repeatedly, at certain predetermined intervals or upon existence of certain conditions. Furthermore, polling allows the polling application to continue executing and remain in control as to when the requested information will be received. As an analogy, polling is similar to repeatedly asking questions like, "do you have that information for me?" or "has this event occurred yet?".

An application that uses polling is called a polling application. A polling request is also called a poll.

A polling application polls a polled application. A polled application may be another application, such as the operating system. The polled application may respond to the polling request in any manner suitable for a particular data processing environment. For example, an operating system may not respond at all, respond selectively, respond in the affirmative or negative, respond with data, or a combination thereof, in response to a polling request.

Latency of a data processing environment is a measure of the time the data processing environment takes to identify and respond to a request. A low latency data processing environment is a data processing environment that is able to respond to a request within a preset threshold time limit. In some example low latency data processing environments, the latency may be only a few microseconds between a request and a response.

Data processing environments, and particularly low latency environments, often include polling as a way for providing quick response when events occur in the data processing environment. A polling application polls repeatedly and responds as soon as a poll returns the desired information. Data processing environments often include a number of polling applications that may poll for a variety of information.

Reporting applications or reporting tools are applications that generate reports using data collected from various data sources. A type of reporting tool can generate a report that provides information about the utilization of computing resources in a data processing environment. Utilization of a resource is a factor of the portion of time used to perform work and the total time over which utilization is determined.

A variety of reporting tools presently exist to generate reports, including utilization reports. Often, reporting tools use different data acquisition methods, such as application program interfaces (APIs), to gather the information from which to compute the report. Additionally, the data acquisition methods of reporting tools are designed to look for and collect the commonly known parameters from well-known system components.

SUMMARY OF THE INVENTION

The illustrative embodiments provide a method, system, and computer usable program product for adjusting processor utilization data stored in a computer memory in a polling environment. An amount of a computing resource consumed during polling performed by the polling application over a predetermined period is received at a processor in a data processing system from a polling application executing in the data processing system. The amount forms a polling amount of the computing resource. Using the polling amount of the computing resource, another amount of the computing resource consumed for performing meaningful task is determined. The other amount forms a work amount of the computing resource. Using the work amount of the computing resource, an adjusted utilization of the computing resource is computed over a utilization interval. The data of the adjusted utilization is saved.

BRIEF DESCRIPTION OF THE DRAWINGS

The novel features believed characteristic of the invention are set forth in the appended claims. The invention itself; however, as well as a preferred mode of use, further objectives and advantages thereof, will best be understood by reference to the following detailed description of an illustrative embodiment when read in conjunction with the accompanying drawings, wherein:

FIG. 1 depicts a pictorial representation of a network of data processing systems in which illustrative embodiments may be implemented;

FIG. 2 depicts a block diagram of a data processing system in which illustrative embodiments may be implemented;

DETAILED DESCRIPTION OF THE PREFERRED EMBODIMENT

Figure 3:
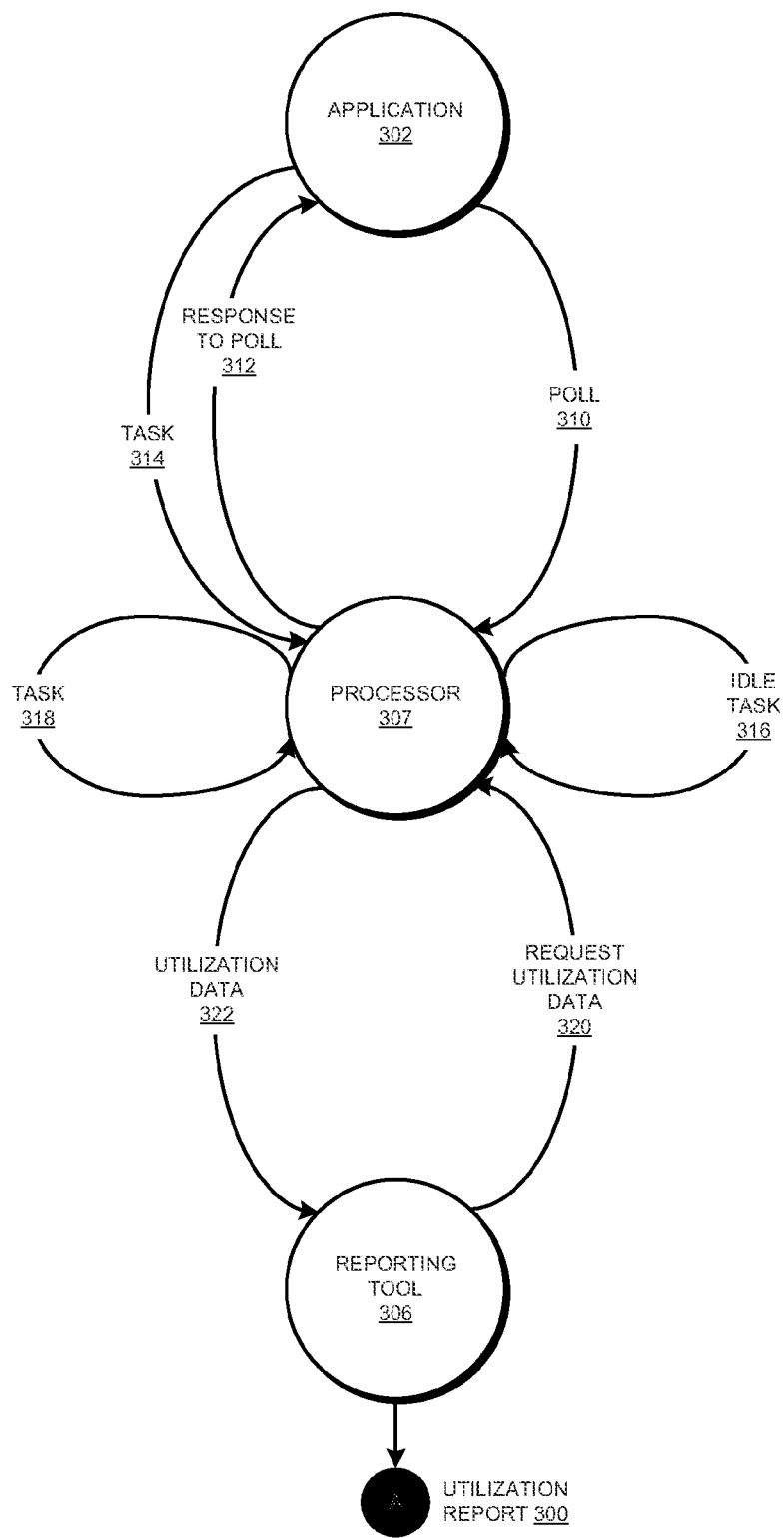
FIG. 3 depicts a flow diagram of activities affecting the computation of utilization that may be modified using the illustrative embodiments.

Utilization of computing resources is determined over a predetermined interval—the utilization interval. The invention recognizes that presently data processing systems provide utilization information in a manner that may not represent a true utilization of the computing resources. For example, in the case of processor utilization, presently processors determine utilization based on the idle time or unused capacity of the processor over the utilization interval.

Idle time is the time for which the processor executes an idle task. In some instances, an idle task is a task designed to execute when the processor is not executing another task, such as a task for an application. In other instances, an idle task may be no task at all, and executing an idle task may then mean executing no task at all. A task, or a meaningful task, is a function that the application is designed to perform for a user or a system. Thus, processor utilization may be a ratio of the utilization interval minus the idle time (to wit, the time presumably used for performing meaningful tasks), divided by the interval.

Particularly with respect to processor utilization, the invention further recognizes that reporting tools employ varied data acquisition methods to collect the utilization information from the processor. The invention further recognizes that the present method of determining processor utilization using the idle time does not give an accurate report of the processor utilization.

The invention further recognizes that in case of polling applications, the utilization information generated in the above described manner may be particularly skewed. As the invention recognizes, when a polling application is polling for the event, the application may not really be performing a meaningful task. When the event occurs, the polling application detects the event in response to the polling, and then the application may perform a meaningful task.

However, a processor has to perform some computations for processing the instructions resulting from the application's polling. The processor also has to process the instructions resulting from the application's performing of a meaningful task. The invention recognizes that the processor presently has no way of distinguishing whether the processor is spending time in performing computations for a meaningful task or a task related to polling. The polling application, however, can distinguish between instructions sent to the processor relating to meaningful tasks and instructions relating to polling.

Furthermore, certain polling applications may have different types of polling tasks—some polling tasks being meaningful in some respect, and others being simply tasks for polling, such as in a busy wait for some event. Accordingly, the invention recognizes that the polling application is the proper determiner of which instructions being sent to the processor are for meaningful tasks and which are for polling.

The invention further recognizes that even though applications may be able to determine how much time of the processor they are actually using for meaningful tasks, reporting tools are not designed to garner this information from the ever-changing collection of applications that can execute on a data processing system. Consequently, even if an application can determine the amount of processor time it consumes for meaningful tasks, that information is not sharable with the reporting tools and therefore cannot be incorporated into utilization reports.

The illustrative embodiments used to describe the invention address and solve the problems related to accurately determining utilization of computing resources. The illustrative embodiments provide a method, computer usable program product, and data processing system for adjusting processor utilization data in environments that execute polling applications. Using the illustrative embodiments, a processor can accurately account for the time consumed for processing polling tasks. Accordingly, the operating system, a hypervisor, or a processor can compute, adjust, and provide more accurate utilization information to reporting tools than is presently available.

The reporting tools can use the adjusted utilization data to generate a more accurate utilization report than is presently generated using present utilization data. Adjusted utilization data is utilization data adjusted for taking into account the distinction between times consumed performing meaningful tasks and polling tasks.

Furthermore, the invention can be configured to reveal or hide from the reporting tools the distinction between the idle time and the time consumed for processing polling tasks. For example, in one embodiment of the invention, the distinction between idle time and time consumed for processing polling tasks may be transparent to a reporting tool. Accordingly, the reporting tool may simply report the adjusted utilization as if the processor were idle during the time spent for processing polling tasks as well. In another example, where the distinction is revealed to a reporting tool according to another embodiment of the invention, the reporting tool may report idle time and time spent for processing polling tasks separately.

The examples in this disclosure are used only for the clarity of the description and are not limiting on the illustrative embodiments. Additional operations, actions, tasks, activities, and manipulations will be conceivable from this disclosure and the same are contemplated within the scope of the illustrative embodiments.

The illustrative embodiments are described using specific code, data structures, designs, layouts, schematics, and tools only as examples and are not limiting on the illustrative embodiments. The illustrative embodiments may be implemented with respect to any type of data or data structure usable for similar purposes.

Furthermore, the illustrative embodiments are described in some instances using particular software tools and data processing environments only as an example for the clarity of the description. The illustrative embodiments may be used in conjunction with other comparable or similarly purposed systems, applications, or architectures. For example, some illustrative embodiments that are described in conjunction with reporting tools can be used in conjunction with any data consumer application that computes using utilization data.

Any advantages listed herein are only examples and are not intended to be limiting on the illustrative embodiments. Additional or different advantages may be realized by specific illustrative embodiments. Furthermore, a particular illustrative embodiment may have some, all, or none of the advantages listed above.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a pictorial representation of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108. Software applications may execute on any computer in data processing environment 100.

In addition, clients 110, 112, and 114 couple to network 102. A data processing system, such as server 104 or 106, or client 110, 112, or 114 may contain data and may have software applications or software tools executing thereon. For example, server 104 may include application 105 that may be a polling application. Client 110 may include a reporting tool, such as reporting tool 111.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client server environment in which the illustrative embodiments may be implemented. A client server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as server 104 or client 110 in FIG. 1, in which computer usable program code or instructions implementing the processes may be located for the illustrative embodiments.

In the depicted example, data processing system 200 employs a hub architecture including North Bridge and memory controller hub (NB/MCH) 202 and south bridge and input/output (I/O) controller hub (SB/ICH) 204. Processing unit 206, main memory 208, and graphics processor 210 are coupled to north bridge and memory controller hub (NB/MCH) 202. Processing unit 206 may contain one or more processors and may be implemented using one or more heterogeneous processor systems. Graphics processor 210 may be coupled to the NB/MCH through an accelerated graphics port (AGP) in certain implementations.

In the depicted example, local area network (LAN) adapter 212 is coupled to south bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238. Hard disk drive (HDD) 226 and CD-ROM 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub (SB/ICH) 204.

An operating system runs on processing unit 206. The operating system coordinates and provides control of various components within data processing system 200 in FIG. 2. The operating system may be a commercially available operating system such as Microsoft® Windows® (Microsoft and Windows are trademarks of Microsoft Corporation in the United States and other countries), or Linux® (Linux is a trademark of Linus Torvalds in the United States and other countries). An object oriented programming system, such as the Java™ programming system, may run in conjunction with the operating system and provides calls to the operating system from Java™ programs or applications executing on data processing system 200 (Java is a trademark of Sun Microsystems, Inc., in the United States and other countries).

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in north bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

With reference to FIG. 3, this figure depicts a flow diagram of activities affecting the computation of utilization that may be modified using the illustrative embodiments. Application 302 may be a polling application such as application 105 in FIG. 1. Processor 304 may be a processor, such as processing unit 206 in FIG. 2, in the data processing system where application 302 may be executing. Reporting tool 306 may be implemented using reporting tool 111 in FIG. 1.

Application 302 may poll processor 304 using poll request 310. Application 302 may make poll request 310 in a repeated manner, such as upon elapse of a predetermined time period, or upon the occurrence of an event.

Processor 304 may process each poll request 310 and respond with response to poll 312. Application 302 and processor 304 may exchange several poll requests 310 and responses to poll 312.

Application 302 may determine from a particular response to poll 312 that a desired event has occurred. Upon such determination, application 302 may send task 314 to processor 304 for processing. Task 314 may be a meaningful task.

When processor 304 is not processing a task, processor 304 may execute idle task 316. When processor 304 received task 314 from application 302, processor 304 executes task 318 corresponding to task 316.

Reporting tool 306 may request utilization data from processor 304 by sending request 320 to processor 304. Processor 304 responds to reporting tool 306 with utilization data 322. Reporting tool 306 uses utilization data 322 to produce utilization report 324. Utilization report 324 may provide utilization information about any computing resource that may be included in utilization data 322 in a given implementation.

Figure 4:
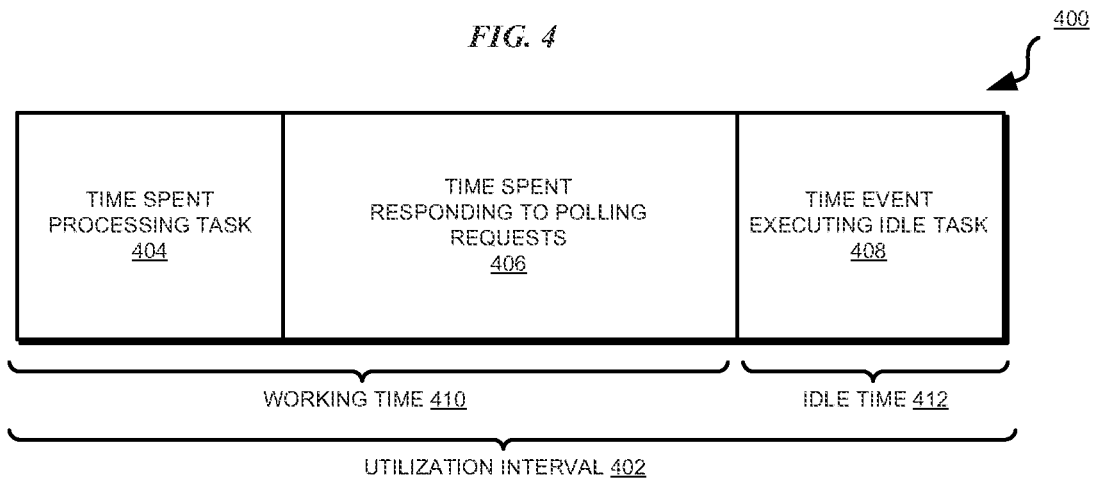
FIG. 4 depicts a block diagram of utilization computation that can be improved using the illustrative embodiments.

With reference to FIG. 4, this figure depicts a block diagram of utilization computation that can be improved using the illustrative embodiments. Block 400 represents utilization interval 402 over which a processor, such as processor 304 in FIG. 3, may measure utilization of computing resources.

As depicted in this figure, a processor, such as processor 304 in FIG. 3, may spend time 404 processing meaningful tasks. The processor may spend time 406 processing polling requests and responding to polls. The processor may spend time 408 executing idle task, such as idle task 316 in FIG. 3.

A processor presently computes utilization of processor time based on the percentage of the utilization interval when the processor executed an idle task. For this manner of computing utilization, the processor presently determines that working time 410 is the total of time 404 and time 406, and idle time 412 is time 408. Accordingly, the processor may determine that utilization of processor time over utilization interval 402 is working time 410 divided by utilization interval 402. In other words, present utilization is utilization interval 402 minus idle time 412, divided by utilization interval 402.

Figure 5:
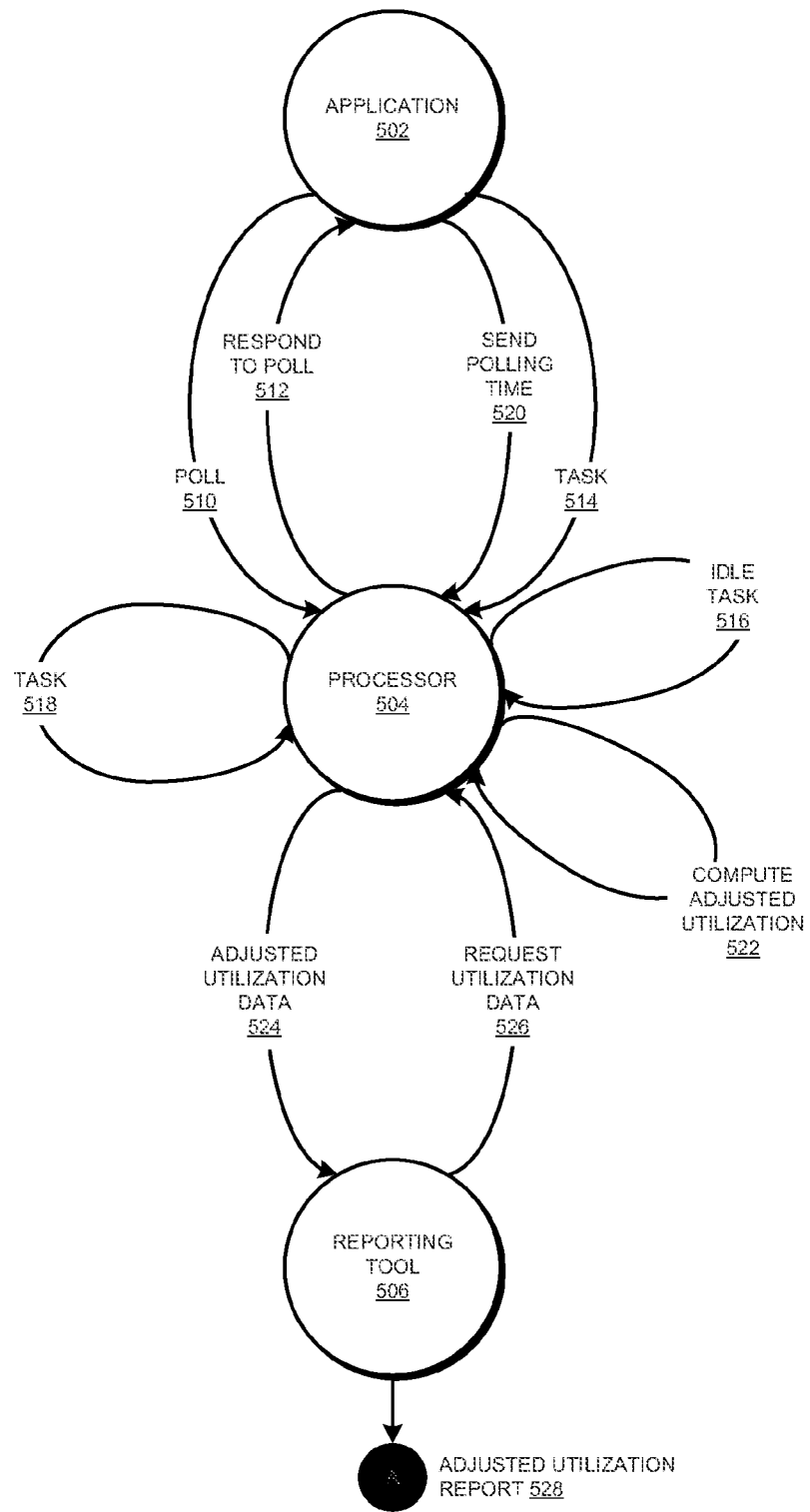
FIG. 5 depicts a flow diagram of computation of adjusted utilization data and generation of an improved utilization report in accordance with an illustrative embodiment.

With reference to FIG. 5, this figure depicts a flow diagram of computation of adjusted utilization data and generation of an improved utilization report in accordance with an illustrative embodiment. Application 502 may be a polling application similar to application 302 in FIG. 3. Processor 504 may be a processor, such as processor 304 in FIG. 3. Reporting tool 506 may be implemented using reporting tool 306 in FIG. 3.

Application 502 may poll processor 504 using poll request 510. Application 502 may send repeated poll request 510 to processor 504.

Processor 504 may process each poll request 510 and respond with response to poll 512. Application 502 and processor 504 may exchange several poll requests 510 and responses to poll 512.

Application 502 may determine from a particular response to poll 512 that a desired event has occurred. Upon such determination, application 502 may send task 514 to processor 504 for processing. Task 514 may be a meaningful task.

When processor 504 is not processing a task, processor 504 may execute idle task 516. When processor 504 received task 514 from application 502, processor 504 executes task 518 corresponding to task 516.

In accordance with an illustrative embodiment, application 502 may transmit to processor 504 the amount of time that application 502 consumed for polling. The amount of time that application 502 consumed for polling is called polling time. Application 502 may send polling time 520 using any mechanism suitable for a particular implementation. For example, in one embodiment, a system call may be created that may allow a thread associated with application 502 to inform the kernel of processor 504 of the processor time that application 502 has consumed for polling. In another embodiment, such a system call may be restricted by presently known techniques to only certain applications 502, such as trusted applications, applications having certain privileges, or applications meeting certain criteria.

In another embodiment, application 502 and processor 504 may share read/write access to a common memory space, such as a register, a memory address, or a file. Application 502 may write the amount of time spent for polling to such shared memory space and processor 504 may read the amount of time from that memory space.

In one embodiment, application 502 may send polling time 520 at the beginning or end of a meaningful task. In another embodiment, application 502 may send polling time 520 at a predetermined interval, such as a predetermined utilization interval. In another embodiment, application 502 may send polling time 520 using a combination of these sending techniques. For example, application 502 may send polling time 520 periodically when executing a polling task or a meaningful task for longer than a utilization period, but at the beginning of a meaningful task as well if application 502 switches from polling task to meaningful task within a given utilization interval.

These examples of sending polling time 520 are described here only for clarity of the description of the invention and are not intended to be limiting on the invention. Many other ways of sending polling time 520 to processor 504 will be apparent from this disclosure and the same are contemplated within the scope of the invention.

Using the information about the amount of time application 502 used for polling in a given utilization interval, processor 504 executes task 522 to compute adjusted utilization data 524. Processor 504 may compute adjusted utilization data 524 in any manner suitable for a particular implementation. For example, in one embodiment, the processor may simply add the polling time received from application 502 to the time used for executing idle task. In another embodiment, processor 504 may allocate different weights to different polling times received from same or different application 502.

In another embodiment, processor 504 may compute and use an amount of polling time different from that reported by application 502, such as hardware resource utilization in lieu of pure time when using hardware multithreading. Other ways of computing adjusted utilization data 524 using the polling time sent from application 502 in the manner of the illustrative embodiments will be apparent from this disclosure and the same are contemplated within the scope of the invention.

Reporting tool 506 may request utilization data from processor 504 by sending request 526 to processor 504. Processor 504 responds to reporting tool 506 with adjusted utilization data 524. Reporting tool 506 uses adjusted utilization data 524 to produce adjusted utilization report 528. Adjusted utilization report 528 may provide utilization information about any computing resource that may be included in adjusted utilization data 524 in a given implementation of the illustrative embodiments.

Figure 6:
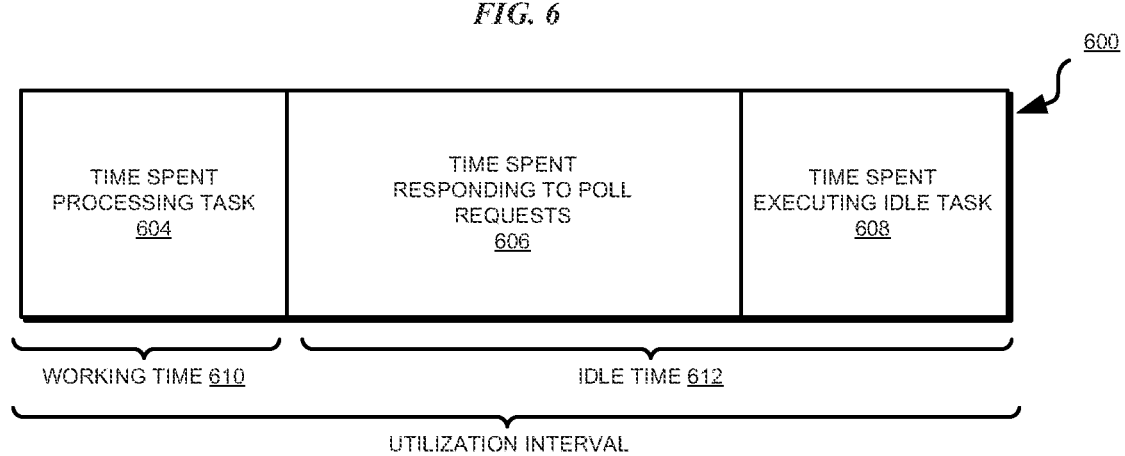
FIG. 6 depicts a block diagram of an example adjusted utilization computation in accordance with an illustrative embodiment.

With reference to FIG. 6, this figure depicts a block diagram of an example adjusted utilization computation in accordance with an illustrative embodiment. Block 600 is a modified form of block 400 in FIG. 4, modified according to an illustrative embodiment.

As depicted in this figure, a processor, such as processor 504 in FIG. 5, may spend time 604 processing meaningful tasks. The processor may spend time 606 processing polling requests and responding to polls. The processor may spend time 608 executing idle task, such as idle task 516 in FIG. 5.

As one example way of computing adjusted utilization of processor time according to an illustrative embodiment, adjusted utilization may be based on the percentage of the utilization interval when the processor executed meaningful tasks. For this computation, the processor may distinguish between time 604 and time 606 by using the polling time information passed from the polling application to the processor, such as by using send polling time 520 activity in FIG. 5. The processor may determine that time 606 was not time spent in processing a meaningful task but was spent in processing polling tasks. Thus, according to an example implementation of the illustrative embodiments, the processor may determine that working time 610 is only time 604 portion of utilization interval 602.

Accordingly, the processor may determine that adjusted utilization of processor time over utilization interval 602 is working time 610 divided by utilization interval 602. In other words, adjusted utilization is utilization interval 402 minus idle time 412, divided by utilization interval 402.

Assume for this example, identical time 604 and time 404 in FIG. 4, identical time 606 and time 406 in FIG. 4, and identical time 608 and time 408 in FIG. 4. For such identity of times, adjusted utilization computed using the illustrative embodiment of FIG. 6 is less than utilization computed using FIG. 4. A utilization report based on the adjusted utilization data from FIG. 6 will be a more accurate portrayal of the utilization of computing resources than the utilization report generated based on utilization data of FIG. 4.

The manner of computing adjusted utilization, to wit, by simply adding the polling time to the idle time, is only a simplified example to describe the operation of the illustrative embodiments and is not limiting on the invention. As described with respect to FIG. 5, many other ways of computing adjusted utilization are possible from this disclosure. An implementation may use any method of including the time spent processing tasks related to polling according to the illustrative embodiments in adjusted utilization computation without departing the scope of the invention.

Figure 7:
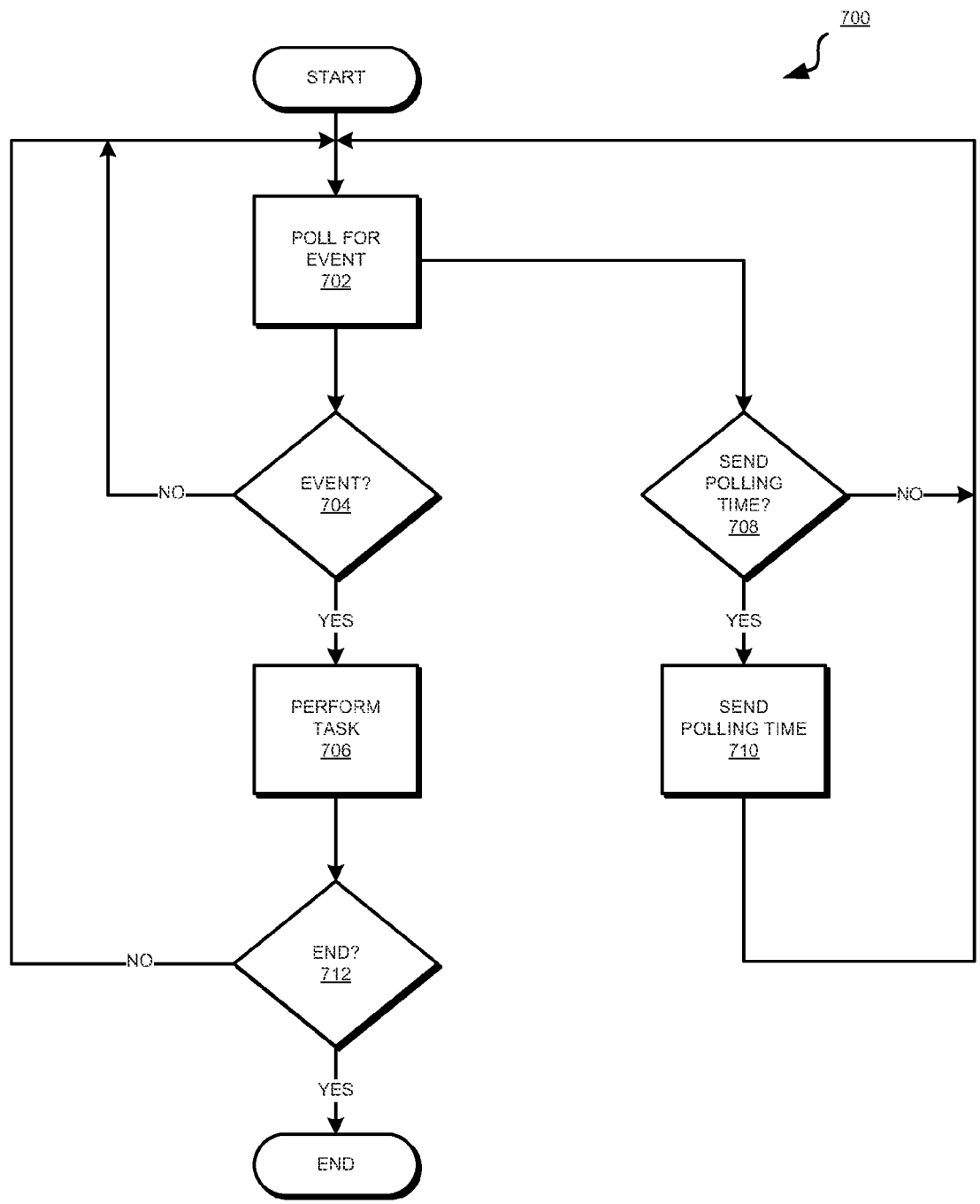
FIG. 7 depicts a flowchart of a process of sending polling time in accordance with an illustrative embodiment.

With reference to FIG. 7, this figure depicts a flowchart of a process of sending polling time in accordance with an illustrative embodiment. Process 700 may be implemented in a polling application, such as application 502 in FIG. 5.

Process 700 begins by polling for an event (step 702). Process 700 determines whether the event has occurred (step 704). If the desired event has not occurred ("No" path of step 704), process 700 returns to step 702. If however, process 700 determines that the event has occurred ("Yes" path of step 704), process 700 performs a task (step 706).

Returning to step 702, while polling for events, process 700 also determines, whether process 700 should send polling time, such as send polling time 520 in FIG. 5 (step 708). As described above, in implementing step 708, a particular implementation may send polling time when a utilization interval elapses, before after or during performing a meaningful task, such as task 706, after a certain number of polling requests have been sent, or based on any other suitable criteria, within the scope of the illustrative embodiments.

If process 700 determines that process 700 should send polling time ("Yes" path of step 708), process 700 sends information about the amount of time spent polling since a predetermined point in time in the past (step 710). If, however, process 700 determines that process 700 should not yet send the polling time ("No" path of step 708), process 700 returns to step 702 and continues polling, performing other tasks, or a combination thereof.

Returning to step 706, process 700 determines if process 700 should end (step 712). If process 700 is not to end ("No" path of step 712), process 700 returns to step 702 and continues performing polling, other tasks, or a combination hereof. If, however, process 700 is to end ("Yes" path of step 712), process 700 ends thereafter.

Figure 8:
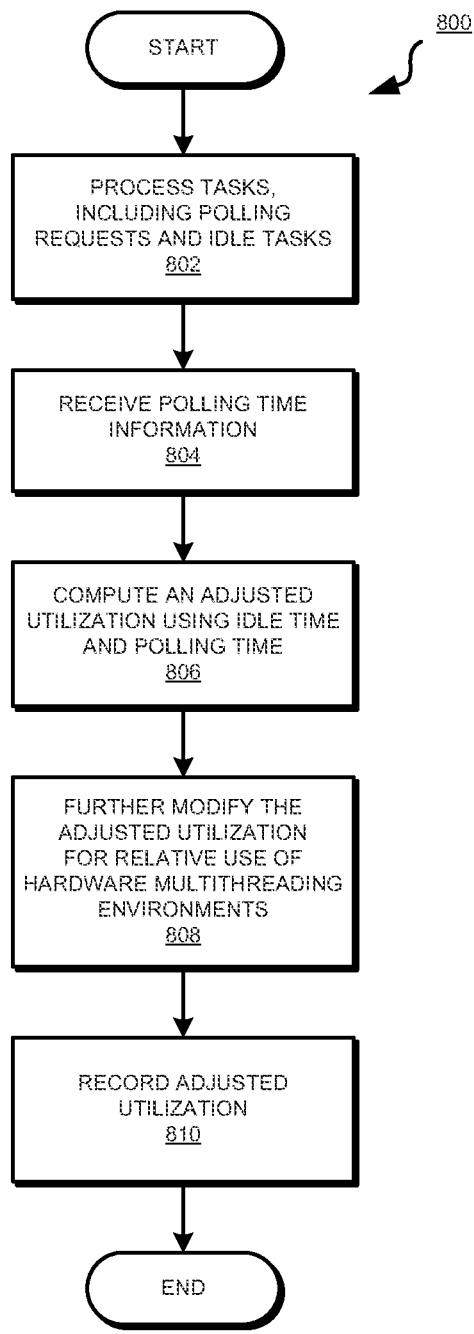
FIG. 8 depicts a flowchart of a process of computing adjusted utilization data in accordance with an illustrative embodiment.

With reference to FIG. 8, this figure depicts a flowchart of a process of computing adjusted utilization data in accordance with an illustrative embodiment. Process 800 can be implemented in a processor, such as processor 504 in FIG. 5.

Process 800 begins by processing tasks, including processing polling requests and idle tasks (step 802). Process 800 receives polling information, such as from a polling application (step 804).

Process 800 computes adjusted utilization data (step 806). In step 806, process 800 distinguishes the time spent processing meaningful tasks for a polling application from the time spent processing polling requests from the polling application. Using this distinction, in one embodiment, process 800 may compute adjusted utilization data about processor time utilization by simply counting the polling time as idle time. In another embodiment, process 800 may compute adjusted utilization of processor time by allocating different weights to the time for processing meaningful tasks and polling time. A particular implementation may use the polling time information of step 804 according to the illustrative embodiments, and implement step 806 in any manner suitable for the implementation without departing the scope of the invention.

Optionally, process 800 may further modify the adjusted utilization for relative use of hardware multithreading environments (step 808). Step 808 may simply be allocating different weights to the times for processing different tasks, including polling time, depending on the relative use of the hardware resources.

Process 800 records the adjusted utilization data thus computed in steps 806 and 808 (step 810). Process 800 ends thereafter. In one embodiment, the recording of step 810 may be saving the adjusted utilization data in a register, cache location, file, or another suitable computer memory. In another embodiment, the recording of step 810 may also include transmitting the adjusted utilization data to another data processing system. In another embodiment, the recording of step 810 may include displaying or printing the adjusted utilization data on a computer display or printer.

The components in the block diagrams and the steps in the flowcharts described above are described only as examples. The components and the steps have been selected for the clarity of the description and are not limiting on the illustrative embodiments of the invention. For example, a particular implementation may combine, omit, further subdivide, modify, augment, reduce, or implement alternatively, any of the components or steps without departing from the scope of the illustrative embodiments. Furthermore, the steps of the processes described above may be performed in a different order within the scope of the invention.

Thus, a computer implemented method, apparatus, and computer program product are provided in the illustrative embodiments for adjusting processor utilization data in polling environments. Using the embodiments of the invention, utilization of computing resources can be computed more accurately than is presently possible. Particularly, the invention is helpful in determining processor time utilization in low latency data processing environments where poling applications may be executing.

Presently existing polling applications can be modified according to the invention to report polling times to a processor in a data processing system. The processor can use the polling time information to compute an adjusted utilization of the processing time according to the invention. Existing reporting tools can continue to collect the utilization data from the processor in the conventional manner, but receive more accurate adjusted utilization data from the processor according to the invention.

Thus, using the invention, existing data processing systems, applications, and reporting tools can provide a more accurate view of the utilization of the computing resources in a data processing environment by using one or more illustrative embodiments of the invention. Generally, the existing reporting tools need not be modified to receive adjusted utilization data according to the invention from a processor.

Additionally, a processor can be configured within the scope of the invention to maintain the presently used utilization data as well as the adjusted utilization data according to the invention. In such circumstances, the presently used utilization data may be called base utilization. By so configuring, the processor may be able to provide the base utilization data, the adjusted utilization data, or both to applications and reporting tools that are adapted to receive one or both from the processor, such as for comparative purposes.

Furthermore, although the illustrative embodiments are described using processing time as an example computing resource, the invention is not limited only to the computation of utilization of processing time resource only. Any computing resource that may be measured, consumed, used, or engaged for performing tasks in a data processing system can be similarly measured for utilization according to the invention. Furthermore, the invention can be adapted to adjust the utilization data for any computing resource within the scope of the invention.

For example, just as a polling application can inform a processor about polling time in accordance with an illustrative embodiment, the polling application can report to the processor the consumption of any other computing resource. As an example, the polling application can report to a processor the amount of network bandwidth consumed for sending and receiving polling related request and responses in the manner of sending polling time. As another example, a polling application can report an amount of memory used for polling related tasks in a manner similar to reporting the polling time. Consumption of any computing resource can be sent in a manner analogous to sending polling time, as described in the examples in the illustrative embodiments.

The invention can take the form of an entirely software embodiment, or an embodiment containing both hardware and software elements. In a preferred embodiment, the invention is implemented in software or program code, which includes but is not limited to firmware, resident software, and microcode.

Furthermore, the invention can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W) and DVD.

Further, a computer storage medium may contain or store a computer-readable program code such that when the computer-readable program code is executed on a computer, the execution of this computer-readable program code causes the computer to transmit another computer-readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage media, and cache memories, which provide temporary storage of at least some program code in order to reduce the number of times code must be retrieved from bulk storage media during execution.

A data processing system may act as a server data processing system or a client data processing system. Server and client data processing systems may include data storage media that are computer usable, such as being computer readable. A data storage medium associated with a server data processing system may contain computer usable code. A client data processing system may download that computer usable code, such as for storing on a data storage medium associated with the client data processing system, or for using in the client data processing system. The server data processing system may similarly upload computer usable code from the client data processing system. The computer usable code resulting from a computer usable program product embodiment of the illustrative embodiments may be uploaded or downloaded using server and client data processing systems in this manner.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to explain the principles of the invention, the practical application, and to enable others of ordinary skill in the art to understand the invention for various embodiments with various modifications as are suited to the particular use contemplated.

What is claimed is:

1. A computer implemented method for adjusting processor utilization data stored in a computer memory in a polling environment, the computer implemented method comprising:
    receiving, by a processor in a data processing system, from a polling application executing in the data processing system, a first amount of a computing resource consumed during polling performed by the polling application over a predetermined period, wherein the polling is a poll for an event, wherein the polling application is configured to determine a time when the first amount is to be provided to the processor and to provide the first amount to the processor at the time;
    computing, by the processor, using the first amount over the predetermined period, a polling amount of the computing resource over a utilization interval, wherein the polling amount of the computing resource is an amount of a computing resource consumed during polling performed by the polling application over the utilization interval;
    determining, by the processor, a second amount of the computing resource consumed for performing meaningful task by subtracting the polling amount of the computing resource from an amount of the computing resource consumed in processing tasks other than idle tasks over the utilization interval, the second amount forming a work amount of the computing resource consumed during the utilization interval;
    computing, by the processor, using a ratio of the work amount of the computing resource consumed during the utilization interval and a total amount of the computing resource consumed during the utilization interval, an adjusted utilization of the computing resource over the utilization interval; and
    saving the adjusted utilization in the computer memory.

2. The computer implemented method of claim 1, further comprising:
    receiving a request for utilization data from a reporting application; and
    responding to the request with the data of the adjusted utilization.

3. The computer implemented method of claim 1, further comprising:
    determining a third amount of the computing resource consumed for an idle task, the third amount forming an idle amount of the computing resource, wherein the computing the adjusted utilization additionally uses the idle amount in computing the adjusted utilization.

4. The computer implemented method of claim 1, wherein receiving the polling amount of computing resource is performed using a system call.

5. The computer implemented method of claim 1, further comprising:
    computing a utilization of the computing resource for a task associated with the polling and the meaningful task, the utilization forming a base utilization; and
    saving the base utilization.

6. The computer implemented method of claim 5, wherein computing the adjusted utilization adjusts the base utilization.

7. The computer implemented method of claim 1, further comprising:
    sending from the polling application the polling amount of computing resource, wherein the sending occurs one of (i) at a predetermined interval, (ii) after sending a predetermined number of polling requests, (iii) before the meaningful task is initiated, (iv) during the meaningful task, and (v) after the meaningful task is executed.

8. The computer implemented method of claim 1, wherein the polling amount of the computing resource is assigned a first weight to form a weighted polling amount, and the working amount of the computing resource is assigned a second weight to form a weighted working amount, the computing the adjusted utilization further comprising:
    computing the adjusted utilization using the weighted polling amount and the weighted working amount.

9. The computer implemented method of claim 1, wherein the polling amount of the computing resource is adjusted according to a first relative use of the computing resource for a polling task to form a relative polling amount, and the working amount of the computing resource is adjusted according to a second relative use of the computing resource for the meaningful task to form a relative working amount, the computing the adjusted utilization further comprising:
    computing the adjusted utilization using the relative polling amount and the relative working amount.

10. A computer usable program product comprising a computer usable storage device including computer usable code for adjusting processor utilization data stored in a computer memory in a polling environment, the computer usable code comprising:
    computer usable code for receiving, by a processor in a data processing system, from a polling application executing in the data processing system, a first amount of a computing resource consumed during polling performed by the polling application over a predetermined period, wherein the polling is a poll for an event, wherein the polling application is configured to determine a time when the first amount is to be provided to the processor and to provide the first amount to the processor at the time;
    computer usable code for computing, by the processor, using the first amount over the predetermined period, a polling amount of the computing resource over a utilization interval, wherein the polling amount of the computing resource is an amount of a computing resource consumed during polling performed by the polling application over the utilization interval;
    computer usable code for determining, by the processor, a second amount of the computing resource consumed for performing meaningful task by subtracting the polling amount of the computing resource from an amount of the computing resource consumed in processing tasks other than idle tasks over the utilization interval, the second amount forming a work amount of the computing resource consumed during the utilization interval;

computer usable code for computing, by the processor, using a ratio of the work amount of the computing resource consumed during the utilization interval and a total the amount of the computing resource consumed during the utilization interval, an adjusted utilization of the computing resource over the utilization interval; and computer usable code for saving the adjusted utilization in the computer memory.

11. The computer usable program product of claim 10, wherein the computer usable code for receiving the polling amount of computing resource performs a system call, the computer usable program product further comprising:

computer usable code for determining a third amount of the computing resource consumed for an idle task, the third amount forming an idle amount of the computing resource, wherein the computer usable code for computing the adjusted utilization additionally uses the idle amount in computing the adjusted utilization;

computer usable code for receiving a request for utilization data from a reporting application; and computer usable code for responding to the request with the data of the adjusted utilization.

12. The computer usable program product of claim 10, further comprising:

computer usable code for computing a utilization of the computing resource for a task associated with the polling and the meaningful task, the utilization forming a base utilization, wherein the computer usable code for computing the adjusted utilization adjusts the base utilization; and computer usable code for saving the base utilization.

13. The computer usable program product of claim 10, further comprising:

computer usable code for sending from the polling application the polling amount of computing resource, wherein the sending occurs one of (i) at a predetermined interval, (ii) after sending a predetermined number of polling requests, (iii) before the meaningful task is initiated, (iv) during the meaningful task, and (v) after the meaningful task is executed.

14. The computer usable program product of claim 10, wherein the polling amount of the computing resource is assigned a first weight to form a weighted polling amount, and the working amount of the computing resource is assigned a second weight to form a weighted working amount, the computer usable code for computing the adjusted utilization further comprising:

computer usable code for computing the adjusted utilization using the weighted polling amount and the weighted working amount.

15. The computer usable program product of claim 10, wherein the polling amount of the computing resource is adjusted according to a first relative use of the computing resource for a polling task to form a relative polling amount, and the working amount of the computing resource is adjusted according to a second relative use of the computing resource for the meaningful task to form a relative working amount, the computer usable code for computing the adjusted utilization further comprising:

computer usable code for computing the adjusted utilization using the relative polling amount and the relative working amount.

16. The computer program product of claim 10, wherein the computer usable code is stored in a computer readable storage medium in a data processing system, and wherein the computer usable code is transferred over a network from a remote data processing system.

17. The computer program product of claim 10, wherein the computer usable code is stored in a computer readable storage medium in a server data processing system, and wherein the computer usable code is downloaded over a network to a remote data processing system for use in a computer readable storage medium associated with the remote data processing system.

18. A data processing system for adjusting processor utilization data stored in a computer memory in a polling environment, the data processing system comprising:

a storage device including a storage medium, wherein the storage device stores computer usable program code; and a processor, wherein the processor executes the computer usable program code, and wherein the computer usable program code comprises:

computer usable code for receiving, by the processor in the data processing system, from a polling application executing in the data processing system, a first amount of a computing resource consumed during polling performed by the polling application over a predetermined period, wherein the polling is a poll for an event, wherein the polling application is configured to determine a time when the first amount is to be provided to the processor and to provide the first amount to the processor at the time;

computer usable code for computing, by the processor, using the first amount over the predetermined period, a polling amount of the computing resource over a utilization interval,. wherein the polling amount of the computing resource is an amount of a computing resource consumed during polling performed by the polling application over the utilization interval;

computer usable code for determining, by the processor, a second amount of the computing resource consumed for performing meaningful task by subtracting the polling amount of the computing resource from an amount of the computing resource consumed in processing tasks other than idle tasks over the utilization interval, the second amount forming a work amount of the computing resource consumed during the utilization interval;

computer usable code for computing, by the processor, using a ratio of the work amount of the computing resource consumed during the utilization interval and a total the amount of the computing resource consumed during the utilization interval, an adjusted utilization of the computing resource over the utilization interval; and computer usable code for saving the adjusted utilization in the computer memory.

19. The data processing system of claim 18, further comprising:

computer usable code for sending from the polling application the polling amount of computing resource, wherein the sending occurs one of (i) at a predetermined interval, (ii) after sending a predetermined number of polling requests, (iii) before the meaningful task is initiated, (iv) during the meaningful task, and (v) after the meaningful task is executed.

20. The data processing system of claim 18, wherein the polling amount of the computing resource is assigned a first weight to form a weighted polling amount, and the working amount of the computing resource is assigned a second weight to form a weighted working amount, the computer usable code for computing the adjusted utilization further comprising:

computer usable code for computing the adjusted utilization using the weighted polling amount and the weighted working amount.

\* \* \* \* \*